L. LILIENFELD.
PROCESS OF MANUFACTURING SUBSTITUTES FOR OILS, CAOUTCHOUC, RESINS, AND THE LIKE.
APPLICATION FILED JUNE 17, 1910.
1,037,158.
Patented Aug. 27, 1912.
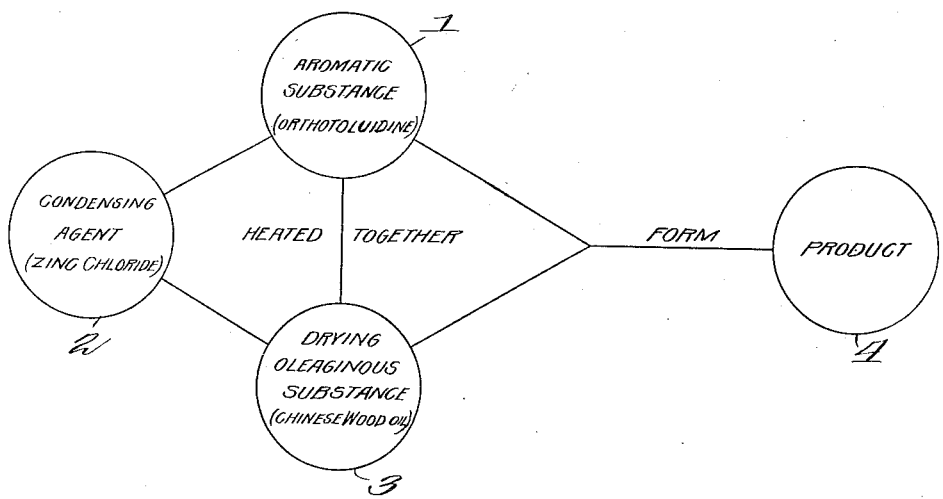
WITNESSES
INVENTOR
LEON LILIENFELD
BY
ATTORNEYS

UNITED STATES PATENT OFFICE.

LEON LILIENFELD, OF VIENNA, AUSTRIA-HUNGARY.

PROCESS OF MANUFACTURING SUBSTITUTES FOR OILS, CAOUTCHOUC, RESINS, AND THE LIKE.

1,037,158.  Specification of Letters Patent.  Patented Aug. 27, 1912.

Application filed June 17, 1910. Serial No. 567,401.

*To all whom it may concern:*

Be it known that I, LEON LILIENFELD, chemist, of Zeltgasse 1, Vienna, VIII, in the Empire of Austria-Hungary, have invented a Process of Manufacturing Substitutes for Oils, Caoutchouc, Resins, and the Like; and I do hereby declare the following to be a full, clear, and exact description of the invention, such as will enable others skilled in the art to which it appertains to make and use the same.

This invention is based on my observation that by treating fats, fatty acids or drying oils, particularly Chinese wood oil or the fatty acids of wood oil, or their derivatives or esters derived from fatty acids and higher alcohols, for example lanolin, with amido derivatives or hydroxyl derivatives of aromatic hydrocarbons or with transformation products of either of these classes of products, and with condensing agents, masses are obtained which, according to the mode of preparation and the quantitative composition of the mixture undergoing reaction, may be used as substitutes for, or admixtures to, caoutchouc, guttapercha, balata or like substances, or plastic masses of the nature of celluloid or like products, or resins. I have also found that the condensation may be conducted in presence of glycerin or its derivatives with the result that products are obtained which in respect of their elasticity and solubility are preferable for some purposes to the products obtained in absence of glycerin.

My invention is illustrated in the accompanying drawing forming part of this application, the said drawing being a diagrammatic view to illustrate in general the chemical reaction.

In carrying out the process, the fat, for instance wood oil, is heated with one or more amido derivatives or one or more hydroxyl derivatives of aromatic hydrocarbons, or a mixture of such derivatives, together with a suitable condensing agent such as chlorid of zinc or chlorid of aluminum or the like, in presence or absence of water. A small proportion of water appears to be advantageous for carrying out the reaction if it is desired to avoid development of too much energy during the process. When the reaction is complete the hot mass is allowed to cool, whereby it acquires the desired consistence; it may then be washed with water. When glycerin or a derivative thereof is used, the operation differs only in that this material is introduced into the mixture in the desired proportion.

The aromatic derivative which volatilizes during the heating operation may be suitably condensed for further use; when glycerin is used some of this volatilizes with the aromatic derivative and may be likewise condensed. The condensation may even be conducted under reduced pressure.

According to the proportion of the aromatic derivative and the condensing agent, and the glycerin, if present, to the fat, such as wood oil, and according to the temperature and the duration of the reaction, the product either is a thick oil or resembles caoutchouc, guttapercha, balata or the like, or is a plastic mass of the nature of celluloid, horn or resins; it may be used as a substitute for such bodies or as admixtures thereto.

The various modifications of the product of the process are more or less transparent and soluble in suitable solvents.

When the products have the consistence of a thick oil, they may be used, for instance, in the manufacture of varnishes and lacquers, either alone or in combination with resins or waxes or drying oils and volatile solvents; or they may be used as an addition to varnishes and lacquers. They are also applicable for water-proofing fabrics, for the manufacture of linoleum and lincrusta, American cloth or the like.

When the products have the general consistence of caoutchouc, they may be substituted for this material or for guttapercha or balata, in many applications; they are elastic and may be used either directly or in solution; their solutions in volatile solvents dry quickly and leave a lustrous residue; they may be used for electric insulation in the form of plates, rings or the like. They are adapted to be rolled, so that they can be combined with comminuted cork, fibers, covering materials, ground leather or the like, to form linoleum, lincrusta, American cloth, leather substitutes, driving belts and washers, either by mixing or kneading them with one or the other of the aforesaid materials or a mixture of them, in absence of a solvent, and then rolling the mixture, or by dissolving them, mixing the solution with the said material and applying it to a suitable support. Their solutions can also be applied with a brush and may be used for making water-proof paper or fabric. In combination with asphalt, pitch, resin, wax, oil or artificial rubber either alone or mixed with each other, they may be used as substitutes for caoutchouc, guttapercha or balata. They may be subjected alone or admixed with one or more of the aforesaid substances, to a process of vulcanization by some known agent for the purpose, such as sulfur or sulfur chlorid. They may be kneaded, either alone or mixed with one or more of the aforesaid substances, with caoutchouc or old rubber or guttapercha or balata and used for substitutes for caoutchouc. In combination with suitable materials such as cellulose either as such or dissolved in ammoniacal cupric oxid solution, derivatives of cellulose, like acetylcellulose, nitrocellulose or viscose, glue or albumin, the products may, with or without the addition of softening agents, be squirted through fine openings or spinning nozzles for making threads suitable as substitutes for spun threads of natural materials like silk. By drying such mixtures in thin layers on supports from which the dried material can be stripped, films may be obtained which are applicable for photography, among other purposes.

Those products which have the consistence of hard plastic masses or resins, may be used alone or mixed with known plastic masses or resins, for purposes to which such plastic masses or resins are applied.

All products obtainable according to the invention may be used for the aforesaid and other purposes either alone or mixed with other materials, for example cellulose and its derivatives such as nitrocellulose, acetylcellulose or viscose; albuminous bodies, such as albumin or casein; glue or gelatin; gums or starches such as gum tragacanth, tragasol, algin, norgin, dextrin, or agar-agar; caoutchouc, balata or guttapercha; soft or hard resins, drying oils, fats, waxes or the like; and a softening agent may be present or not. The union of the products made according to this invention with one or more other materials and softening agents may be effected by mixing or kneading without the use of any solvent, or the product may be dissolved and the solution mixed with the other material or materials in an undissolved or a dissolved condition. Notwithstanding that the products are insoluble in water, they may be incorporated with aqueous solutions of many of the aforesaid binding agents, such as ammoniacal cupric solutions of cellulose, solutions of starch, glue or albumin. This may be necessary for those binding agents which are not soluble in solvents that dissolve the products.

The following examples illustrate the invention:

1. 1 kilo of Chinese wood oil, 1 kilo of orthotoluidin and 60–100 grams of zinc chlorid, preferably dissolved in 60–100 grams of water, are well mixed together and the mixture is heated to 200–300° C. The chemical action in general is illustrated in the drawing. In the figure the circle 1 designates the aromatic substance, 2 the condensing agent, 3 the drying oleaginous substance, and 4 the final product. During the heating operation, samples of the mixture are withdrawn and allowed to solidify in order to ascertain whether the desired degree of consistence has been attained. The consistence of a thick oil is very soon attained; after further heating the mixture solidifies, on cooling, to a soft plastic mass, and after still further heating the consistence on cooling is similar to that of caoutchouc or guttapercha. In this condition the mixture which has solidified to the desired product exhibits no stickiness. According to the desired consistence the heating operation is interrupted at the stage in which the sample, on cooling, has the desired properties. By still further heating, a hard product is obtained which in respect of elasticity and similarity to caoutchouc is considerably inferior to the product at an earlier stage of the heating. The cooled or solidified products are always transparent, and if not heated too long are soluble in many volatile solvents, such as benzene, toluene, turpentine oil, acetone, alcohol, ether, carbon bisulfid, carbon tetrachlorid, light petroleum, chlorhydrin, or amyl acetate. The products are soluble in drying and nondrying fats and oils. Should an error have been made in judging the sample, and a product have been obtained not having the desired consistence, the mass may be reheated until the consistence on cooling is correct.

2. 1 kilo of anilin, 1 kilo of Chinese wood oil and 60–100 grams of zinc chlorid, preferably dissolved in 60–100 grams of water are treated in the manner described in Example 1.

3. 1 kilo of ortho-toluidin, 1 kilo of Chinese wood oil, and 60–100 grams of aluminium chlorid, preferably dissolved in 60–100 grams of water, are treated in the manner described in Example 1.

4. 1 kilo of resorcinol, 1 kilo of Chinese wood oil and 60–100 grams of zinc chlorid or aluminum chlorid, preferably dissolved in 60–100 grams of water, are treated in the manner described in Example 1.

5. 1.2 kilos of Chinese wood oil, 1.2 kilos of orthotoluidin, 1.2–3 kilos of glycerin and 72–100 grams of zinc chlorid, preferably dissolved in 72–100 grams of water, are well mixed and the mixture is heated to 200°–300° C. and further treated as described in Example 1. The manufacture of hard products is facilitated by increasing the proportion of the condensing agent, as illustrated in the following example:

6. 1 kilo of ortho-toluidin, 1 kilo of Chinese wood oil and 150–200 kilos of zinc chlorid, preferably dissolved in 60–100 grams of water, are heated together until a test portion on cooling shows a resinous consistence, whereupon the reaction is interrupted and the mixture allowed to cool.

In the foregoing examples the proportions may be varied as may be desirable for obtaining different products. It is impossible to set forth here all the possible combinations and proportions. Less of the aromatic derivative and more of the wood oil, or less or more of the condensation agent or glycerin may be used in order to obtain different useful products.

I desire to call particular attention to the fact that the process described herein results in different products from those effected by the use merely of the oleaginous substance and the condensing agent alone. In other words the aromatic substance has an important function. For instance, if Chinese wood oil is heated with zinc chlorid alone, one can only obtain polymerized wood oil coagulates, which are not soluble in volatile solving agents, and furthermore they show no resinaceous, or resiniform character. Nor does the addition of resin oil produce the products which are sought by my process, for when wood oil, resin oil, and zinc chlorid are heated together the result is nothing but a thick black smear. The use of the aromatic substance therefore forms one of the main features of my invention, since the products formed are soluble in volatile solvents which dry quickly and leave a lustrous residue. They are of a resiniform character and can be kept without coagulation.

What I claim as my invention and desire to secure by Letters Patent is:

1. The herein described process of manufacturing compositions of matter which consists in heating a drying oleaginous substance with an aromatic substance in the presence of a condensing agent.

2. The herein described process of manufacturing compositions of matter which consists in heating a drying oil with an aromatic derivative in the presence of a condensing agent.

3. The herein described process of manufacturing compositions of matter which consists in heating wood oil with amido derivatives of aromatic hydrocarbons together with a suitable condensing agent.

4. The herein described process of manufacturing compositions of matter which consists in heating wood oil with orthotoluidin in the presence of zinc chlorid.

In testimony whereof I have signed my name to this specification in the presence of two subscribing witnesses.

LEON LILIENFELD.

Witnesses:
    FRED P. SCHUMANN,
    AUGUST FUGGER.